UNITED STATES PATENT OFFICE.

NATHAN GRÜNSTEIN, OF FRANKFORT-ON-THE-MAIN, GERMANY, ASSIGNOR TO THE FIRM OF CHEMISCHE FABRIK GRIESHEIM-ELEKTRON, OF FRANKFORT-ON-THE-MAIN, GERMANY, A CORPORATION OF GERMANY.

MANUFACTURE OF ACETIC ACID.

1,081,959. Specification of Letters Patent. Patented Dec. 23, 1913.

No Drawing. Application filed March 7, 1912. Serial No. 682,273.

*To all whom it may concern:*

Be it known that I, NATHAN GRÜNSTEIN, a subject of the Emperor of Russia, and resident of Frankfort-on-the-Main, Germany, have invented certain new and useful Improvements in the Manufacture of Acetic Acid, of which the following is a specification.

The present invention relates to a process for the manufacture of acetic acid from aldehydes by oxidation by means of oxygen.

The oxidation of acetaldehyde into acetic acid by means of oxygen or air takes place under ordinary conditions very slowly, and cannot be employed as an industrial process for the preparation of the said acetic acid. According to the process in which molecular proportions of oxygen and acetaldehyde are caused to react on each other under pressure, great technical difficulties are experienced, as well as a danger of explosion and only molecular proportions of oxygen itself can be used in the process.

According to this invention it has been found that acetaldehyde can be very rapidly and easily oxidized into acetic acid by means of oxygen if from the beginning of the oxidation of the aldehyde, there is added to the latter glacial acetic acid, its chlorin derivatives, acetic anhydrid, its homologues or a mixture thereof, the action of the aforesaid acids upon the aldehyde producing compounds which are of importance for the proper progress of the oxidation.

The process in accordance with this invention may be carried out as follows:—A considerable quantity of acetic acid (for instance 200 kilograms) is introduced into a vessel or vessels provided with a stirring or agitating device, and a small amount of acetaldehyde (for instance 10 to 20 kilograms) is added thereto, while briskly stirring or agitating the contents, oxygen, atmospheric air, or air rich in oxygen being passed through the mixture. At a temperature of from 70° to 100° C. a very rapid oxidation of the aldehyde into acetic acid commences, while, by using oxygen, waste gases are not generally produced, especially if the slight amount of carbon dioxid formed be removed from time to time. When the greater part of the added aldehyde is oxidized, a fresh portion of acetaldehyde is added, and the process proceeded with. When a quantity of acetic acid corresponding to the capacity of the apparatus has formed, a part of this acid is removed, and the process again proceeded with. The acid so removed is subjected to a distillation, the small amount of acetaldehyde still present being first obtained and then a pure acetic acid of high percentage. The yield is almost equal to the theoretical as by maintaining the above-named temperature, scarcely 1 per cent. of carbon dioxid is produced.

The initial addition of ready made acetic acid required to commence the reaction may however be avoided, by treating from the first only acetaldehyde with oxygen or air. There is then formed as is known, a small amount of acetic acid, but the oxidation proceeds so slowly that a practical application of the process is not possible. If, however, the introduction of the oxygen is continued for some considerable time, the aldehyde becomes enriched with the sparingly produced acetic acid. In addition to this one part of the aldehyde is carried away by the unutilized oxygen, so that finally a concentrated acetic acid is produced which contains but little aldehyde. If in this, or a similar, way such a solution is produced, it is possible by supplying further quantities of aldehyde and oxygen, to obtain acetic acid in accordance with the hereinbefore described process.

The process may be carried out as follows:—A current of oxygen is caused to pass slowly through a series of vessels filled with acetaldehyde and provided with stirrers or agitators. The last vessel is connected to a reflux condenser so that the aldehyde that has been taken up in the form of vapor is for the greater part condensed thereon, the uncondensed aldehyde being recovered in the washing of the escaping gases. The oxygen is in this way slowly absorbed and titration effected from time to time will confirm a gradual increase of the concentration of the acetic acid. A part of the aldehyde is carried away from the first vessel by excess of oxygen, so that finally there is left in the first vessel an acid having a content of about 75 per cent. of acetic acid. There is also gradually formed in the other vessels a tolerably concentrated acid. The current of oxygen is increased and aldehyde is added in small portions. At about 80° C. the formation of acetic acid proceeds very rapidly. In this arrangement, the process could also be carried out in such a manner that the individual vessels are not replenished with the required aldehyde, but the latter is supplied continuously by systematically inserting apparatus charged with fresh aldehyde.

The oxygen used in the reaction gasifies in the first apparatus, through which it flows in a large excess and corresponding amounts of acetaldehyde condense in the rear apparatus. In this manner a concentration takes place in the first vessel, while at the same time the supply of aldehyde in the other vessels is thereby insured.

It is generally advisable in all the processes described not to supply the aldehyde portion-wise, but continuously in the form of vapor. The oxygen or the air serves then first to gasify the aldehyde, and the mixture of aldehyde and oxygen is supplied uninterruptedly to the reaction liquor.

If acetic anhydrid be used for initiating the reaction, a very intensive oxidation of the aldehyde takes place, further products arising from the action of the acetic anhydrid on the acetaldehyde in the presence of acetic acid being formed. From time to time the acetic acid obtained is as already stated, distilled off and the process continued.

I have also found that in using acetic acid, acetic anhydrid and the like for the initiation and acceleration of the reaction, as well as in the production of acetic acid without the initial addition of the said reagents, the presence of oxygen carriers is of great assistance, the oxidation being carried out at a lower temperature and with greater speed. Oxygen carriers suitable for this purpose are vanadium-pentoxid, uranium oxid, roasted ferroso-ferric oxid and the like, and if the operation be carried out in the manner as hereinbefore described with oxygen temperatures of from 40° to 80° C. are sufficient when such oxygen carriers are present. The process carried on in the presence of any of the above catalysts for oxidation by means of atmospheric air is especially suitable, the aldehyde entrained by the escaping nitrogen being recovered by washing with water. In lieu of acetaldehyde, its polymerization products or a mixture of the same may be used.

The process can be carried out by effecting the oxidation in columns, tubes, towers, or in other like reaction chambers containing a surface giving mass such as pieces of glass, or broken pots, or the like materials that can be wetted with acetic acid, acetic anhydrid and the like, catalyzers being again added with advantage. In this case too, the addition of acetic acid may be dispensed with, especially when catalysts are employed. If a mixture of aldehyde and oxygen be passed through such reaction chambers, the oxidation is also in this case scarcely perceptible; the reaction is however very intense if the gas mixture is passed through for some considerable time, so that the reaction mass is soaked with the acetic acid thus slowly formed. Further especial advantages are also obtained by using sufficiently high towers, tubes, and the like, arranged on the counter current principle, the oxygen caused to enter at the lower end of the apparatus, and the acetaldehyde to flow in at the upper part. After a comparatively short time so much acetic acid is formed at the lower part of the apparatus, that the entering oxygen meets a mixture of acetic acid and aldehyde which is suitable for the favorable progress of the reaction.

As in the formation of acetic acid from acetaldehyde and oxygen, the heat of reaction is considerable, care must be taken to insure a proper cooling. In the carrying out of the process in apparatus provided with stirring or agitating devices, and the like, wherein there is always a great excess of ready finished acetic acid, the latter takes up the heat of reaction, and as in this arrangement the temperature cannot exceed the boiling point of acetic acid, a danger of explosion is excluded. But care must be exercised to insure a good cooling so as to avoid an overheating and explosion when apparatus containing large surface giving masses, such as towers and the like, are employed, and especially when catalysts are present. In general the temperature is preferably maintained below 100° C.

The term "oxygen" is used in the following claims as generic to oxygen itself and gases such as air containing oxygen. The terms "organic acid accelerating agent" and "compounds containing the acetic radical" are similarly used as generic to glacial acetic acid itself, its chlorin derivatives, acetic anhydrid, etc., which compounds have been indicated as accelerating agents.

No claim specific to the above described process in which an accelerating agent is not initially mixed with the acetaldehyde is made herein, as the same forms the subject-matter of a divisional application, filed March 8, 1913, Serial No. 753,127.

What I claim is—

1. The process of manufacturing acetic acid from acetaldehyde which comprises introducing oxygen into the same in the presence of an accelerating agent.

2. The process of manufacturing acetic acid from acetaldehyde which comprises introducing oxygen into the same in the presence of an organic acid accelerating agent.

3. The process of manufacturing acetic acid from acetaldehyde which comprises introducing oxygen from the same in the presence of a compound containing the acetic radical.

4. The process of manufacturing acetic acid from acetaldehyde which comprises introducing oxygen into the same in the presence of acetic acid.

5. The process of manufacturing acetic acid from acetaldehyde which comprises introducing oxygen into the same in the presence of an accelerating agent, and of an oxygen carrier.

6. The process of manufacturing acetic acid from acetaldehyde which comprises introducing oxygen into the same in the presence of an organic acid accelerating agent, and of an oxygen carrier.

7. The process of manufacturing acetic acid from acetaldehyde which comprises introducing oxygen into the same in the presence of a compound containing the acetic radical, and of an oxygen carrier.

8. The process of manufacturing acetic acid from acetaldehyde which comprises introducing oxygen into the same in the presence of acetic acid, and of an oxygen carrier.

9. The process of manufacturing acetic acid from acetaldehyde which comprises adding to the aldehyde an organic acid accelerating agent, and passing oxygen through the mixture.

10. The process of manufacturing acetic acid from acetaldehyde which comprises adding to the aldehyde a compound containing the acetic radical, and passing oxygen through the mixture.

11. The process of manufacturing acetic acid from acetaldehyde which comprises adding to the aldehyde an organic acid accelerating agent, and passing oxygen through the mixture in the presence of an oxygen carrier.

12. The process of manufacturing acetic acid from acetaldehyde which comprises adding to the aldehyde a compound containing the acetic radical, and passing oxygen through the mixture in the presence of an oxygen carrier.

13. The process of manufacturing acetic acid from acetaldehyde which comprises adding to the aldehyde acetic acid, and passing oxygen through the mixture.

14. The process of manufacturing acetic acid from acetaldehyde which comprises adding to the aldehyde glacial acetic acid, and passing oxygen through the mixture.

15. The process of manufacturing acetic acid from acetaldehyde which comprises adding to the aldehyde acetic acid, and passing oxygen through the mixture in the presence of an oxygen carrier.

16. The process of manufacturing acetic acid from acetaldehyde which comprises adding to the aldehyde glacial acetic acid, and passing oxygen through the mixture in the presence of an oxygen carrier.

17. The process of manufacturing acetic acid from acetaldehyde which comprises introducing aldehyde into a relatively large amount of acetic acid, passing oxygen into the mixture until most of the aldehyde has been oxidized to acetic acid, introducing a further amount of aldehyde and continuing the treatment.

18. The process of manufacturing acetic acid from acetaldehyde which comprises introducing aldehyde into a relatively large amount of acetic acid while stirring, passing oxygen into the mixture at a temperature of from 70° to 100° C. until most of the aldehyde has been oxidized to acid, adding a further amount of aldehyde and continuing the treatment.

19. The process of manufacturing acetic acid from acetaldehyde which comprises introducing aldehyde into a relatively large amount of acetic acid, passing oxygen into the mixture in the presence of an oxygen carrier until most of the aldehyde has been oxidized to acetic acid, introducing a further amount of aldehyde and continuing the treatment.

20. The process of manufacturing acetic acid from acetaldehyde which comprises introducing aldehyde into a relatively large amount of acetic acid while stirring, passing oxygen into the mixture in the presence of an oxygen carrier at a temperature of from 70° to 100° C. until most of the aldehyde has been oxidized to acid, adding a further amount of aldehyde and continuing the treatment.

In testimony whereof I have signed my name to this specification in the presence of two subscribing witnesses.

NATHAN GRÜNSTEIN.

Witnesses:
 FRANZ HASSLACHER,
 ERWIN DIPPEL.